United States Patent

[11] 3,578,760

| [72] | Inventor | Kimino Shinmura<br>Tokyo, Japan |
|---|---|---|
| [21] | Appl. No. | 787,404 |
| [22] | Filed | Dec. 27, 1968 |
| [45] | Patented | May 18, 1971 |
| [73] | Assignee | Kabushiki Kaisha Honda Gijutsu<br>Kenkyusho<br>Saitama-ken, Japan |
| [32] | Priority | Jan. 17, 1968 |
| [33] |  | Japan |
| [31] |  | 43/2147 |

[54] POWER TRANSMISSION APPARATUS
4 Claims, 2 Drawing Figs.

[52] U.S. Cl. .................................................. 74/701,
74/359, 74/606
[51] Int. Cl. ..........................................F16h 37/00,
B60k 17/06
[50] Field of Search..........................................74/700, 701

[56] References Cited
UNITED STATES PATENTS

| 730,597 | 6/1903 | Balzer........................... | 74/701 |
| 1,629,518 | 5/1927 | Martin........................... | 74/701 |
| 2,103,543 | 12/1937 | McCormick et al. ......... | 74/701 |
| 2,116,486 | 5/1938 | Baker............................ | 74/701X |
| 2,306,545 | 12/1942 | Kummich....................... | 74/701 |
| 2,712,245 | 7/1955 | Lee ............................... | 74/701X |
| 2,807,340 | 9/1957 | Butterworth ................. | 74/701X |
| 3,017,787 | 1/1962 | Payne............................ | 74/701 |
| 3,150,543 | 9/1964 | Dangauthier................. | 74/700 |
| 3,350,960 | 11/1967 | Lamburn et al. ............. | 74/701 |

FOREIGN PATENTS

| 786,813 | 6/1935 | France ......................... | 74/701 |
| 954,185 | 4/1964 | Great Britain................. | 74/201 |
| 571,011 | 12/1957 | Italy.............................. | 74/701 |

*Primary Examiner*—Carlton R. Croyle
*Assistant Examiner*—Thomas C. Perry
*Attorney*—Waters, Roditi, Schwartz & Nissen ABSTRACT: A power transmission apparatus in which an input shaft driven by a prime mover is provided with respective driving gears for low-speed and high-speed operation and with spaced, respective hydraulic-operated frictional clutches for selectively connecting the gears to the shaft, there being an output shaft extending parallel to the input shaft and provided with spaced driven gears in mesh with respective driving gears and with an output gear partly projecting into the space formed between the two clutches and directly driving an adjacent differential gear apparatus.

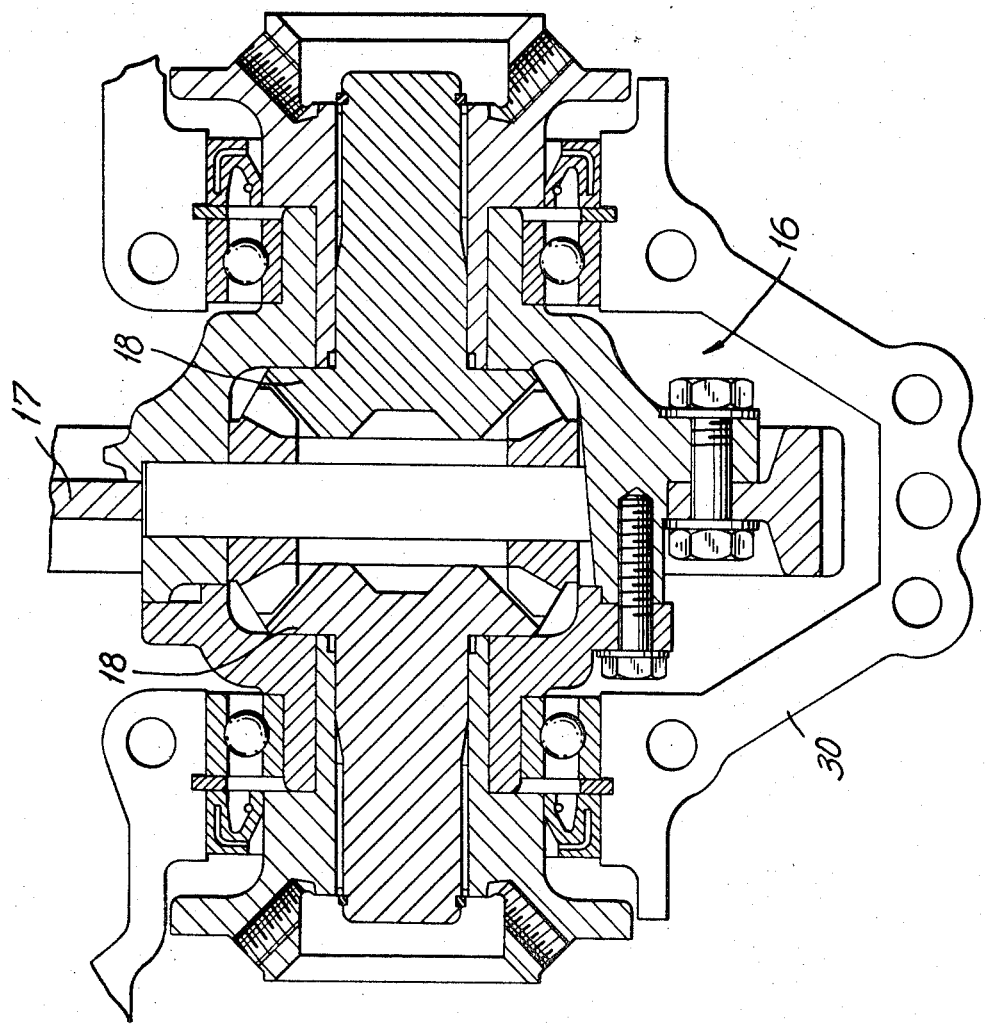

POWER TRANSMISSION APPARATUS

BRIEF SUMMARY OF THE INVENTION

This invention relates to a power transmission apparatus for a motorcar in which a low-speed system and a high-speed system are selectively operated by respective oil-pressure-operated frictional clutches. The apparatus is characterized by an arrangement wherein an input shaft driven by a prime mover, such as an internal combustion engine, is provided with respective driving gears for low-speed and high-speed operations and respective hydraulic-operated frictional clutches between said driving gears for selectively connecting these gears to the shaft, an output shaft being provided and extending in parallel with the input shaft and carrying respective driven gears in mesh with the respective driving gears while at the middle portion of the output shaft there is mounted an output gear partly projecting into a space between the two clutches. Adjacent the output shaft is a differential gear apparatus driven by the output gear.

BRIEF DESCRIPTION OF THE DRAWING

FIG. 2 is a cross section through the lower portion of the power transmission apparatus.

DETAILED DESCRIPTION

Figure 1:
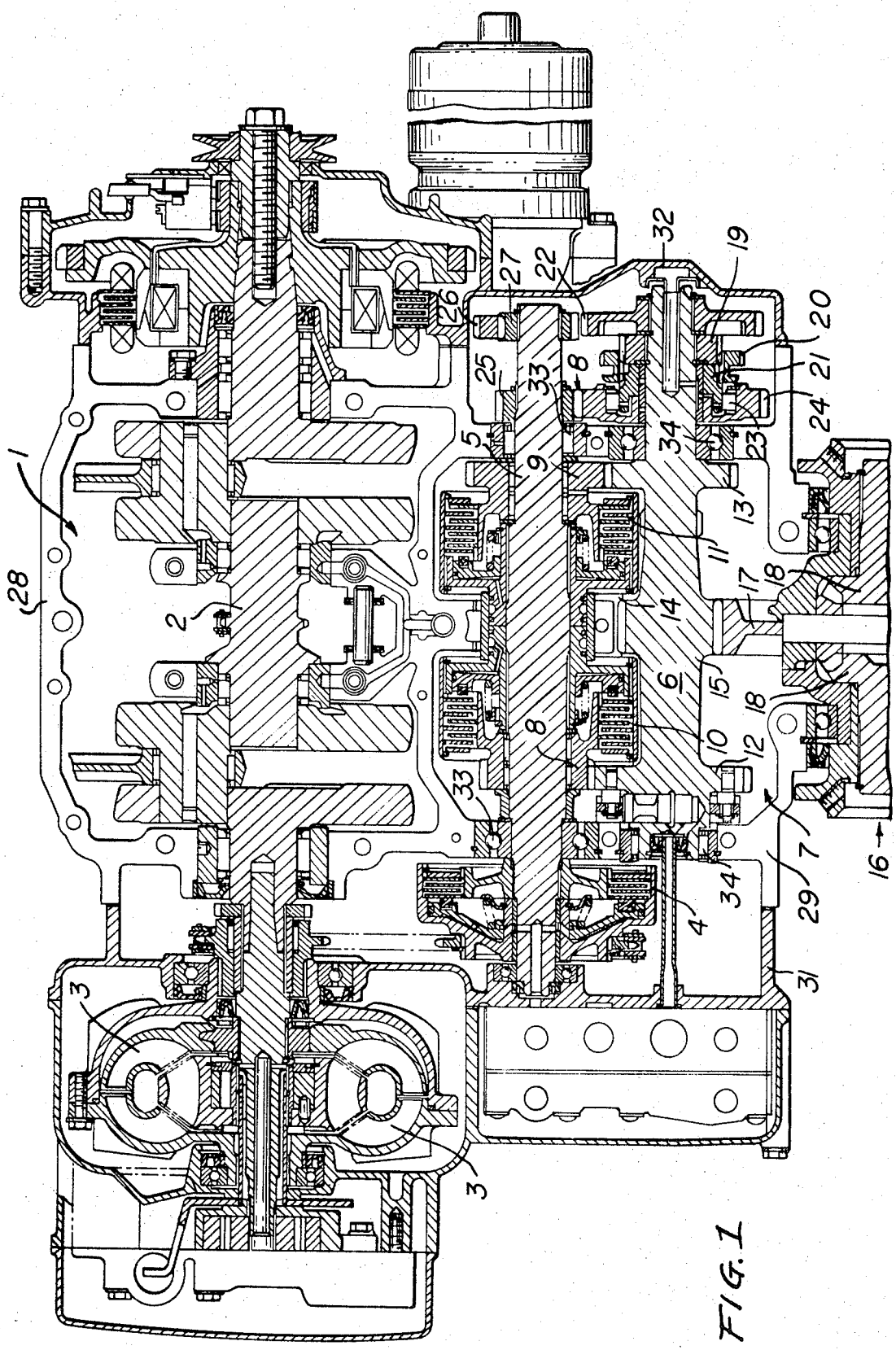
FIG. 1 is a cross section through the top portion of an embodiment of power transmission apparatus according to the invention.

Referring to the drawing, numeral 1 denotes an internal combustion engine and numeral 2 a crank shaft of the engine. An input shaft 5 is drivingly connected to the crank shaft 2 through a torque converter 3 and an oil-pressure-operated main clutch 4. An output shaft 6 extends parallel to the input shaft 5 and is coupled therewith by a speed-change apparatus 7. The speed-change apparatus comprises a pair of driving gears 8 and 9 for low-speed and high-speed operation, respectively, loosely mounted on the input shaft 5 in spaced relation, and a pair of tubular-type, oil-pressure-operated frictional clutches 10 and 11 are provided therebetween, such that when the clutches 10 and 11 are selectively operated, i.e. when the clutches 10 and 11 are selectively supplied with pressure oil, the corresponding gears 8 and 9 are selectively connected to the shaft 5 for rotation therewith. Additionally, a pair of driven gears 12 and 13, in mesh with the respective driving gears 8 and 9, are fixedly mounted on the output shaft 6 and at the middle portion of the shaft 6 an output gear 15 is also fixedly mounted in such a manner that a part thereof projects within a space 14 formed between the two clutches 10 and 11.

Numeral 16 denotes a differential gear apparatus adjacent the change-speed apparatus 7 and directly engaged at a central ring gear 17 thereof with the output gear 15. The differential gear apparatus is also connected at both side gears 18 thereof to respective vehicles wheels (not shown).

The illustrated embodiment is constructed so that not only may a second speed and a third speed be obtained by the change-speed apparatus 7 but also first speed and reverse may be obtained by the following mechanism. Namely, a third driven gear 19 is fixedly mounted on the end portion of the output shaft 6 and a pair of gears 21 and 22, selectively engageable through a selector 20 with the gear 19, are rotatably mounted on shaft 6 on opposite sides of the gear 19. The gear 21 has one end formed as the inner member of a one-way clutch 23, and the outer member of the clutch 23 is constituted as a gear which is in mesh with a third driving gear 25 on the input shaft 5. The gear 22 is engaged, through an intermediate gear 26, with a fourth driving gear 27 on the input shaft 5, so that if the two clutches 10 and 11 are disengaged, and the selector 20 is moved to the left in the drawing, the input shaft 5 is directly coupled through the one-way clutch 23 to the output shaft 6 to obtain first speed, whereas if the selector 20 is moved to the right in the drawing, the input shaft 5 is directly coupled though the gears 27, 26 and 22 to the output shaft 6 to rotate the same in the reverse direction for obtaining reverse speed.

In the illustrated embodiment, a casing 28 for the crank chamber of the engine 1, a casing 29 for the speed-change apparatus 7 and a casing 30 for the differential gear apparatus 16 are formed into a single integral casing divided into upper and lower parts, and side covers 31 and 32 are applied to both outside surfaces thereof. The input shaft 5 is extended at one end into the interior of one side cover 31 to position the main clutch 4 therein, and the input and output shafts 5 and 6 are extended at their other ends into the interior of the other side cover 32 to position therein the mechanisms for first speed and reverse as mentioned above. Numerals 33 designate bearings for supporting both ends of the input shaft 5, and numerals 34 designate bearings for supporting both ends of the output shaft 6.

The operation of the apparatus is as follows:

If the frictional clutch 10 is operated, the low-speed-system gear 8 is connected to the input shaft 5, so that the drive of the shaft 5 is transmitted through the gear 8, and the gear 12 meshed therewith, to the output shaft 6 for obtaining low speed (for example, second speed). If the frictional clutch 11 on the right is operated, the high-speed-system gear 9 is connected thereto, so that the drive of the input shaft 5 is transmitted through the gear 9, and the gear 13 meshed therewith, to the output shaft 6 to obtain high speed (for example, third speed).

Thus according to this invention, second and third speeds can be freely obtained by the selective operation of respective frictional clutches, so that the operation is simple and accurate. Additionally, each clutch is provided on the input shaft 5 which has the highest speed among all the parts of the power transmission apparatus, so that the clutch can be comparatively small in resisting torque, in comparison with the case where the clutch is provided on the output shaft of lower speed. Therefore the clutch can be of comparatively small capacity and size. Furthermore, the space between the two clutches is utilized to accommodate a portion of the output gear, so that the distance between the input and output shafts can be minimized, and it is possible for the differential gear apparatus to be directly driven by the output gear to enable the entire apparatus to be compact and small in size. Additionally, the two clutches and the two gear trains are arranged symmetrically right and left, so that it is easy to provide uniform lubrication and cooling for every part.

I claim:

1. Power transmission apparatus adapted for being driven by the crankshaft of an internal combustion engine, said apparatus comprising an input shaft, a main clutch for coupling the input shaft in driving relation with the crankshaft, a pair of driving gears loosely mounted on said input shaft in spaced relation, respectively for high-speed and low-speed operation, clutch means including a pair of spaced frictional clutches for selectively coupling said gears to said input shaft for common rotation, an output shaft adjacent the input shaft and including a pair of driven gears respectively in mesh with said driving gears, an output gear on said output shaft for delivering power, said output gear projecting into the space between the clutches so as to be partly accommodated therebetween, a differential coupled to said output gear for being driven thereby to supply external power, a pair of further gears on said input shaft for common rotation therewith, gears rotatable on sad output shaft respectively in mesh with said further gears, a fixed gear on said output shaft, a selector slidably mounted on said output shaft for selectively coupling to said fixed gear, the gears on the output shaft which are in mesh with the further gears on said input shaft whereby the gears on the output shaft can drive the output shaft from the input shaft to provide two further speeds of operation for the output shaft, a common casing enclosing said differential, said driving gears, said clutch means and said crankshaft, said common casing having opposite ends, and hollow covers for closing said ends, said main clutch extending outside said casing at one end thereof and being enclosed in one of said covers, said selector, the fixed gear, the further gears and the gears on the output shaft which mesh with said further gears all extending outside the common casing at the other end thereof and being enclosed in said other cover.

2. Apparatus as claimed in claim 1, wherein the clutches are hydraulically operated.

3. Apparatus as claimed in claim 1 wherein said clutch means, said output gear, and said pairs of driven and driving gears are symmetrically arranged relative to said shafts.

4. Apparatus as claimed in claim 3 wherein said input and output shafts are parallel.